(12) United States Patent
West

(10) Patent No.: US 10,771,427 B2
(45) Date of Patent: Sep. 8, 2020

(54) SYSTEMS AND METHODS FOR DETERMINING CHARACTER ENTRY DYNAMICS FOR TEXT SEGMENTATION

(71) Applicant: VERISIGN, INC., Reston, VA (US)

(72) Inventor: Andrew West, Reston, VA (US)

(73) Assignee: VERSIGN, INC., Reston, VA (US)

( * ) Notice: Subject to any disclaimer, the term of this patent is extended or adjusted under 35 U.S.C. 154(b) by 64 days.

(21) Appl. No.: 15/046,814

(22) Filed: Feb. 18, 2016

(65) Prior Publication Data
US 2017/0244664 A1 Aug. 24, 2017

(51) Int. Cl.
| | |
|---|---|
| G06F 17/27 | (2006.01) |
| H04L 29/12 | (2006.01) |
| G06F 40/242 | (2020.01) |
| G06F 40/247 | (2020.01) |
| G06F 40/284 | (2020.01) |
| G10L 15/05 | (2013.01) |

(52) U.S. Cl.
CPC ........ *H04L 61/1511* (2013.01); *G06F 40/242* (2020.01); *G06F 40/247* (2020.01); *G06F 40/284* (2020.01); *G10L 15/05* (2013.01); *H04L 61/302* (2013.01)

(58) Field of Classification Search
CPC ...................................................... G06F 17/27
USPC .......... 704/9, 7, 10; 707/766, 687; 709/206; 715/780, 773, 704, 249, 234
See application file for complete search history.

(56) References Cited

U.S. PATENT DOCUMENTS

| | | | | |
|---|---|---|---|---|
| 5,528,743 A * | 6/1996 | Tou | ....................... | G06F 40/189 715/234 |
| 5,704,060 A * | 12/1997 | Del Monte | ............. | H03M 7/30 |
| 7,129,932 B1 * | 10/2006 | Klarlund | ................ | G06K 9/723 345/168 |
| 8,086,441 B1 * | 12/2011 | Raffill | ..................... | G06F 40/53 704/7 |
| 9,298,276 B1 * | 3/2016 | Bi | ......................... | G06F 3/0236 |
| 2004/0153522 A1 * | 8/2004 | Hirose | ................. | H04L 69/329 709/206 |
| 2005/0149507 A1 * | 7/2005 | Nye | ...................... | G06F 16/951 |
| 2007/0124301 A1 | 5/2007 | Elbaz et al. | | |
| 2009/0234632 A1 * | 9/2009 | Hasegawa | ................ | G06F 3/01 704/1 |

(Continued)

OTHER PUBLICATIONS

Extended European Search Report dated Aug. 1, 2017, European Application No. 17156717.5, pp. 1-8.

*Primary Examiner* — Michael Colucci
(74) *Attorney, Agent, or Firm* — MH2 TECHNOLOGY LAW GROUP, LLP

(57) ABSTRACT

A method can include receiving a string of characters. The method can include determining one or more possible word boundaries for words in the string of characters based at least partially on a segmentation process. The method can also include determining, for each character in the string of characters, an amount of time between entry of each character on an input device. The method can include determining, based at least partially on the amount of time and the one or more possible word boundaries, one or more actual word boundaries for the words in the string of characters. The method can also include outputting one or more determined words in the string of characters based at least partially on the one or more actual word boundaries.

19 Claims, 8 Drawing Sheets

(56) References Cited

U.S. PATENT DOCUMENTS

| | | | |
|---|---|---|---|
| 2010/0205529 A1* | 8/2010 | Butin | G06F 9/453 |
| | | | 715/704 |
| 2011/0285651 A1* | 11/2011 | Temple | G06F 3/0233 |
| | | | 345/173 |
| 2012/0084281 A1 | 4/2012 | Colosi | |
| 2014/0040730 A1* | 2/2014 | Prasad | G06F 40/103 |
| | | | 715/249 |
| 2014/0067731 A1* | 3/2014 | Adams | G06N 20/00 |
| | | | 706/12 |
| 2014/0114929 A1* | 4/2014 | Henrichs | G06F 16/258 |
| | | | 707/687 |
| 2014/0115525 A1* | 4/2014 | Farmer | G06F 16/3322 |
| | | | 715/780 |
| 2014/0280285 A1* | 9/2014 | Quinion | G06F 16/3325 |
| | | | 707/766 |
| 2014/0359515 A1* | 12/2014 | Medlock | G06F 3/04886 |
| | | | 715/773 |
| 2015/0212710 A1* | 7/2015 | Gupta | G06Q 30/0641 |
| | | | 705/27.1 |
| 2015/0332168 A1 | 11/2015 | Bhagwat et al. | |
| 2015/0347381 A1* | 12/2015 | Bellegarda | G06F 40/274 |
| | | | 704/9 |
| 2016/0034046 A1* | 2/2016 | Waddell | G06F 3/0418 |
| | | | 345/173 |
| 2016/0070441 A1* | 3/2016 | Paek | G06F 3/04842 |
| | | | 715/773 |
| 2016/0352679 A1* | 12/2016 | Hagen | H04L 63/1416 |

\* cited by examiner

SYSTEMS AND METHODS FOR DETERMINING CHARACTER ENTRY DYNAMICS FOR TEXT SEGMENTATION

FIELD

The present disclosure generally relates to the field of character analysis.

BACKGROUND

The Internet enables a user of a computer system to identify and communicate with millions of other computer systems located around the world. Integral to network communication is the entry and communication of strings of characters between the computer systems. For example, a client computer system may identify each of these other computer systems using a unique numeric identifier for that computer called an Internet Protocol ("IP") address. When a communication is sent from a client computer system to a destination computer system, the client computer system may specify the IP address of the destination computer system in order to facilitate the routing of the communication to the destination computer system. The Domain Name System (DNS) has been developed to make it easier for users to remember the addresses of computers on the Internet. DNS resolves a unique alphanumeric domain name that is associated with a destination computer into the IP address for that computer. Thus, a user who wants to visit the Verisign website need only remember the domain name "verisign.com" rather than having to remember the Verisign web server IP address, such as 65.205.249.60. Additionally, for example, strings of characters are utilized in search requests, text messages, email communication, social media applications, and the like.

Currently, when a string of characters is entered, the string of characters often does not include markers, e.g., spaces, that identify words in the string of characters. For example, a computer system or user may enter the string of characters "thisisadomain.com." Because of the structure of the domain name, the string of characters does not include markers to identify the words in the string. To process the string of characters, for example, for searching, domain name suggestion, etc., the string of characters needs to be broken into the words contained in the string of characters. For example, in order to process and utilize "thisisadomain.com," the string of characters needs to be segmented or broken into its component words, e.g., "this is a domain." To address this, text segmentation or tokenization algorithms have been utilized to identify the words.

Currently most segmentation or tokenization algorithms rely on dictionaries, "word fitness", character co-occurrence, and other linguistic properties. These algorithms, however, may not be able to accurately identify the words in the string of characters. For example, if a string of characters "choosespain.com" is entered, the linguistic based algorithms may equally identify the possible words as "chooses" and "pain," or "choose" and "spain." Thus, there is a need for systems and methods that address and enhance the segmentation of strings of characters.

SUMMARY

Aspects of the present disclosure are directed to a method. The method can include receiving a string of characters. The string of characters can represent a potential domain name to be registered. Additionally, the method can include determining one or more possible word boundaries for words in the string of characters based at least partially on a segmentation process. The method can also include determining, for each character in the string of characters, an amount of time between entry of each character on an input device. Further, the method can include determining, based at least partially on the amount of time and the one or more possible word boundaries, one or more actual word boundaries for the words in the string of characters. The method can also include outputting one or more determined words in the string of characters based at least partially on the one or more actual word boundaries.

In some aspects, determining one or more actual word boundaries can include determining a pair of characters that has a first amount of time between entry of the pair of characters that exceeds a second amount of time; comparing the pair of characters to the one or more possible word boundaries; and determining, based on the comparison, the one or more actual word boundaries from the one or more possible word boundaries that match the pair of characters.

In some aspects, the second amount of time is an amount of time between entry of the other pairs of characters.

In some aspects, the method can include determining one or more alternate words for the one or more determined words. The one or more alternate words can have a similar meaning to the one or more determined words.

In some aspects, the method can include receiving a selection of at least one of the one or more alternate words, and registering the at least one of the one or more alternative words as a domain name.

In some aspects, the segmentation process can include one or more of a dictionary segmentation, a character co-occurrence segmentation, a linguistic segmentation, a word fitness segmentation.

Aspects of the present disclosure are also directed to another method. The method can include receiving a string of characters. The string of characters can represent a search request. The method can also include determining one or more possible word boundaries for words in the string of characters based at least partially on a segmentation process. Further, the method can include determining, for each character in the string of characters, an amount of time between entry of each character on an input device. Additionally, the method can include determining, based at least partially on the amount of time and the one or more possible word boundaries, one or more actual word boundaries for the words in the string of characters. The method can also include outputting, to a search engine, one or more determined words in the string of characters based at least partially on the one or more actual word boundaries.

Aspects of the present disclosure are also directed to another method. The method can include receiving a string of characters. The string of characters can represent entry of the string of characters on an input device. The method can also include determining one or more possible word boundaries for words in the string of characters based at least partially on a segmentation process. Additionally, the method can include determining, for each character in the string of characters, an amount of time between entry of each character on the input device. Further, the method can include determining, based at least partially on the amount of time and the one or more possible word boundaries, one or more actual word boundaries for the words in the string of characters. The method can also include outputting, to the input device, one or more determined words in the string of characters based at least partially on the one or more actual word boundaries.

Aspects of the present disclosure are also directed to a non-transitory computer-readable medium including instructions which, when executed by at least one processor, cause the at least one processor to perform a method. The method can include receiving a string of characters. The string of characters can represent a potential domain name to be registered. Additionally, the method can include determining one or more possible word boundaries for words in the string of characters based at least partially on a segmentation process. The method can also include determining, for each character in the string of characters, an amount of time between entry of each character on an input device. Further, the method can include determining, based at least partially on the amount of time and the one or more possible word boundaries, one or more actual word boundaries for the words in the string of characters. The method can also include outputting one or more determined words in the string of characters based at least partially on the one or more actual word boundaries.

It is to be understood that both the foregoing general description and the following detailed description are exemplary and explanatory only and are not restrictive of the disclosure, as claimed.

BRIEF DESCRIPTION OF THE DRAWINGS

The drawings are not necessarily to scale. Instead, emphasis is generally placed upon illustrating the principles of the disclosures described herein. The accompanying drawings, which are incorporated in and constitute a part of this specification, illustrate several implementations consistent with the disclosures and together with the description, serve to explain the principles of the disclosures. In the drawings.

DETAILED DESCRIPTION

Figure 1:
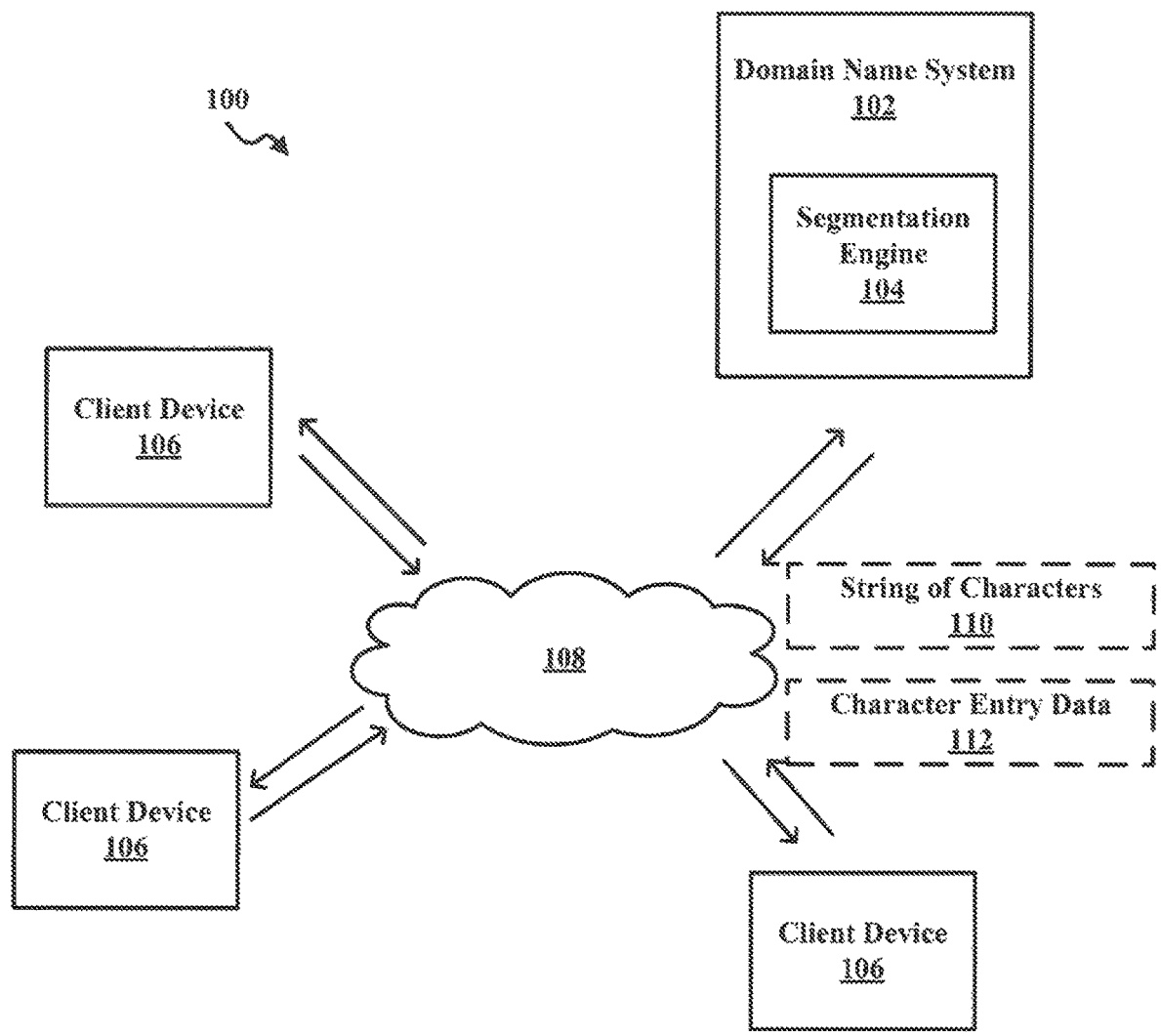
FIG. 1 shows an example of an environment, in which strings of characters can be analyzed, according to implementations.

The following detailed description refers to the accompanying drawings. Wherever possible, the same reference numbers are used in the drawings and the following description to refer to the same or similar parts. Also, similarly-named elements perform similar functions and are similarly designed, unless specified otherwise. Numerous details are set forth to provide an understanding of the implementations described herein. The implementations may be practiced without these details. In other instances, well-known methods, procedures, and components have not been described in detail to avoid obscuring the implementations described. While several exemplary implementations and features are described herein, modifications, adaptations, and other implementations are possible, without departing from the spirit and scope of the disclosure. Accordingly, the following detailed description does not limit the disclosure. Instead, the proper scope of the disclosure is defined by the appended claims.

FIG. 1 illustrates an example of an environment 100, according to various implementations. While FIG. 1 illustrates various components contained in the environment 100, FIG. 1 illustrates one example of an environment, which can be used in the processes described herein, and additional components can be added and existing components can be removed.

As illustrated in FIG. 1, the environment 100 can include a domain name system 102. The domain name system 102 can be configured to provide domain name services and other network services in the environment 100. For example, the domain name system 102 can be part of or in communication with a domain name registry or domain name registrar. In this example, the domain name system 102 can provide registration of domain names, suggestion of domain name for registration, resolution of domain names, and the like. In another example, the domain name system 102 can provide or be in communication with a search engine. In this example, the domain name system 102 can provide search services, for example, Internet searches.

For example, a new domain name may be registered by a user through a domain name system 102. The user may submit to the registrar a request that specifies the desired domain name. The domain name system 102 can consult a central registry that maintains an authoritative database of registered domain names to determine if a domain name requested by a user is available for registration, or if it has been registered by another. If the domain name has not been registered, the domain name system 102 can indicate to the user that the requested domain is available for registration. The user may submit registration information and a registration request to the domain name system 102, which may cause the domain to be registered. If the domain is already registered, the domain name system 102 can inform the user that the domain is not available. If the domain name is not available, the domain name system 102 can provide or suggest other domain names that are available for registration and have similar meaning or association to the requested domain name.

The domain name system 102 can be embodied in one or more computer system. For example, the domain name system 102 can be any type of conventional computer system, such as desktop, laptop, server, etc., or mobile device, such as a smart telephone, tablet computer, cellular telephone, personal digital assistant, etc. The domain name system 102 can include hardware resources, such as processors, memory, network hardware, storage devices, and the like, and software resources, such as operating systems (OS), application programs, and the like.

The domain name system 102 can include a segmentation engine 104. The segmentation engine 104 can be configured to determine words that are contained in string of characters. The segmentation engine 104 can be configured to determine the words contained in a string of characters by analyzing character entry data for the string of characters. In implementations, the character entry data can include timing information of the characters entered for the string of characters such as an amount of time to enter a character and an amount of time between entering different characters on an input device. For example, the character entry data can include keystroke information such as an amount of time to key a character on a keyboard and an amount of time between keying different characters on a keyboard. The segmentation engine 104 can utilize the character entry data to identify word boundaries for words in the string of characters. For example, the segmentation engine 104 can utilize and analyze the amount of time between entering different characters to identify a "pause" or "break" in entry of the characters that signals possible breaks in words. For example, the segmentation engine 104 can utilize and analyze the amount of time between keying different characters that signals a possible breaks in words. For instance, as characters are entered on an input device, a user may unconsciously or instinctually "pause" or "break" at word boundaries even if a space or character break is not entered.

The segmentation engine 104 can provide analysis and segmentation of the string of characters to improve or enhance the services provided by the domain name system 102. For example, the segmentation engine 104 can analyze and segment a string of characters that are used in domain name suggestion, domain name registration, and search requests and provide an identification of words in the string of character to aid the domain name suggestion, domain name registration, and search requests. The segmentation engine 104 can also aid in the entry of strings of characters on input devices, such as keyboards, keypads, soft keyboards etc., and provide an identification of words in the string of characters to aid in the operations and features of the input devices, such as auto completion of words, auto correction of words, and the like.

In some implementations, as illustrated, the segmentation engine 104 can be a component of the domain name system 102. For example, the segmentation engine 104 can be a software program or application, a hardware component, and combination thereof. In some implementations, the segmentation engine 104 can be a standalone computer system that communicates with the domain name system 102. In this implementation, the segmentation engine 104 can include hardware resources, such as processors, memory, network hardware, storage devices, and the like, and software resources, such as operating systems (OS), application programs, and the like. In some implementations, the segmentation engine 104 can be a component of one or more client devices 106.

The domain name system 100 can communicate with the client devices 106 via a network 108. The client devices 106 can be any type of computer device that can communicate with the domain name system 102 via the network 108. For example, the client device 106 can be any type of conventional computer system, such as desktop, laptop, server, etc., or mobile device, such as a smart telephone, tablet computer, cellular telephone, personal digital assistant, etc. The client device 106 can include hardware resources, such as processors, memory, network hardware, storage devices, and the like, and software resources, such as operating systems (OS), application programs, and the like. The network 108 can be any type of communications networks, whether wired or wireless, to allow the computer system to communicate, such as wide-area networks or local-area networks. For example, the network 108 can include the Internet.

In implementations, the segmentation engine 104 can be configured to analyze a string of characters 110 received from the client device 106. For example, the client device 106 (or user of the client device 106) may desire to provide the string of characters 110, representing a possible domain name, to the domain name system 102 and receive one or more suggested domain names from the domain name system 102. In this example, the segmentation engine 104 can be configured to determine words in the string of characters 110 to aid the suggestion of domain names.

Likewise, for example, the client device 106 (or user of the client device 106) may desire to provide the string of characters 110, for searching the network 108 and receive results of the search. In this example, the segmentation engine 104 can be configured to determine words in the string of characters 110 to aid the searching processes. Likewise, for example, segmentation engine 104 can be configured to determine words in the string of characters 110 to aid in the entry of string of characters. In this example, the segmentation engine 104 can be included in a client device 106 and provide the word segmentation to aid in the entry of strings of characters. For example, the word segmentation can aid in operations such as auto correction, word suggestion, and the like.

To provide the string of characters to the domain name system 102 and the segmentation engine 104, the user of the user device 106 can enter the string of characters on an input device of the user device 106. For example, the user can enter the string of characters on a keyboard, keypad, touch screen, and the like. Additionally, to receive the string of characters, the domain name system 102 (or the segmentation engine 104) can provide an interface for the client device 106 (or user of the client device 106) to enter the string of characters. In some implementations, the interface can be a graphical user interface (GUI) that includes one or more entry fields to allow entry of a string of characters. In some implementation, the interface may be an application programming interface (API) that allows the client device 106 to access the services of the domain name system 102 and the segmentation engine 104.

In some implementations, the segmentation engine 104 can be configured to determine character entry data 112 from the string of characters 110. In some implementations, the domain name system 102 can be configured to determine character entry data 112 from the string of characters 110. In some implementations, the character entry data 112 can be determined by the client device 106 and provided to the domain name system 102 or the segmentation engine 104.

While FIG. 1 illustrates the segmentation engine 104 being embodied in the domain name system 102, the segmentation engine 104 can be embodied in any computer system of the environment 100. For example, the segmentation engine 104 can be embodied in the client device 106. Likewise, the processes and features of the segmentation engine 104 can be provided to any system, device, or process communicating with the segmentation engine 104, for example, search engines, application programs (e.g. social media application), and the like.

Figure 2:
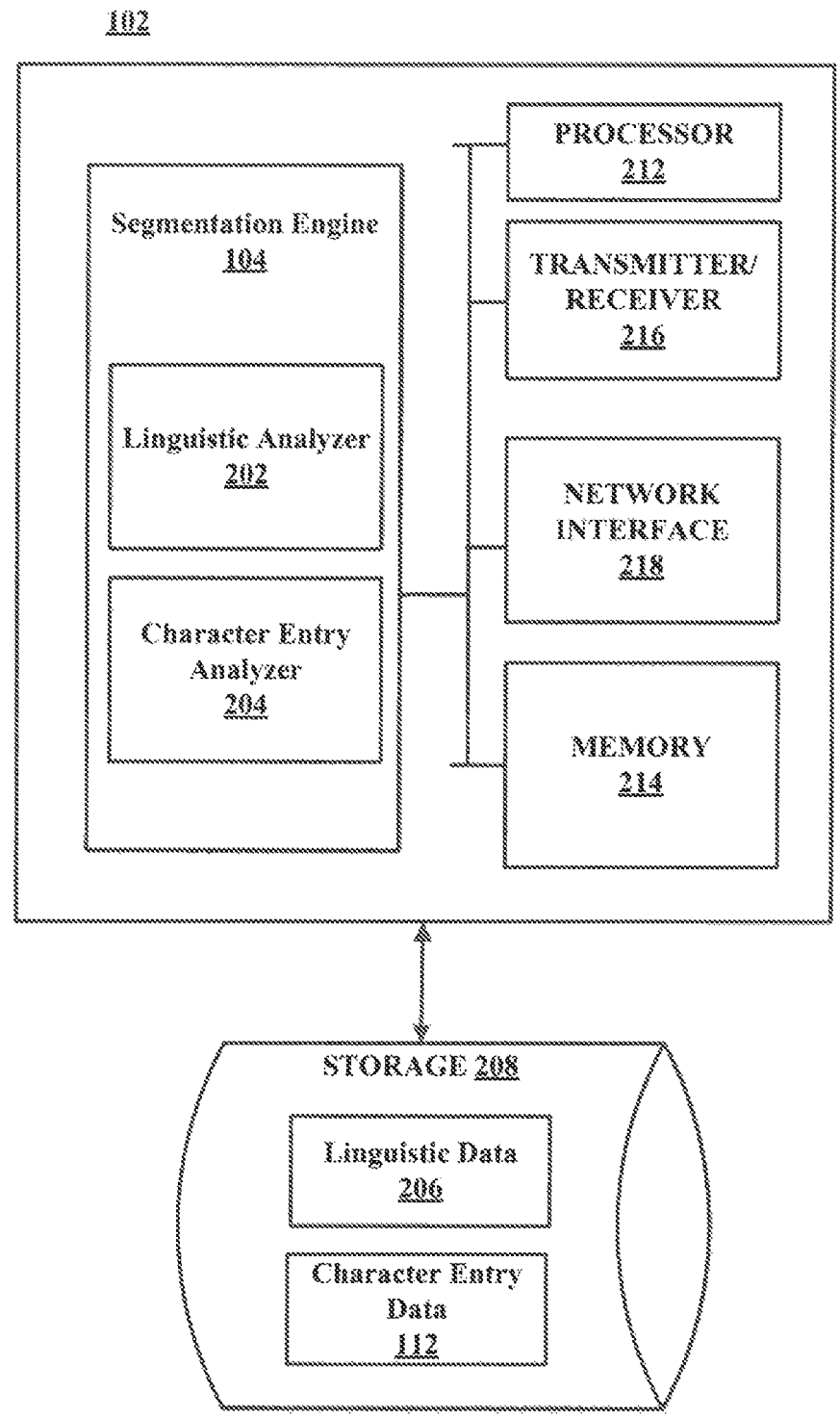
FIG. 2 shows an example of a domain name system, according to implementations.

FIG. 2 illustrates an example of the domain name system 102, according to various implementations. While FIG. 2 illustrates various components contained in the domain name system 102, FIG. 2 illustrates one example of a domain name system, which can be used in the processes described herein, and additional components can be added and existing components can be removed. Additionally, while FIG. 2 is described as a domain name system, the computer system illustrated in FIG. 2 can be any type of computer system such as a search engine, an application server, a client device, and the like.

As illustrated, the domain name system 102 can include the segmentation engine 104. In some implementations, the segmentation engine 104 can be implemented as software programs or applications that are capable of executing on the domain name system 102. In some implementations, the segmentation engine 104 can be implemented as software and hardware in the domain name system 102.

The segmentation engine 104 can include a linguistic analyzer 202 and a character entry analyzer 204. The linguistic analyzer 202 can be configured to analyze a string of characters to determine possible word boundaries for the string of characters. The linguistic analyzer 202 can be configured to analyze the string of characters utilizing one or more linguistics based algorithms, for example, dictionaries searches, "word fitness" algorithms, character co-occurrence algorithms, and other linguistic based algorithms. The linguistic analyzer 202 can be configured to access a data structure, for example, linguistics data 206 in a storage 208. The linguistics data 206 can include dictionaries, "word fitness" data, character co-occurrence data, and other linguistic data.

The character entry analyzer 204 can be configured to analyze a string of characters based on character entry data, as described herein. The character entry analyzer 204 can be configured to determine words that are contained in the string of characters. The segmentation engine 104 can be configured to determine the words contained in a string of characters by analyzing the character entry data 112, which can be stored in storage 208, for the string of characters. In implementations, the character entry data 112 can include timing information of the characters entered for the string of characters such as an amount of time to enter a character and an amount of time between entering different characters on an input device. For example, the character entry data 112 can include keystroke information such as an amount of time to key a character on a keyboard and an amount of time between keying different characters on a keyboard. The character entry analyzer 204 can utilize the character entry data 112 to identify word boundaries for words in the string of characters. For example, the character entry analyzer 204 can utilize and analyze the amount of time between entering different characters to identify a "pause" or "break" in entry of the characters that signals possible breaks in words. For example, the character entry analyzer 204 can utilize and analyze the amount of time between keying different characters that signals a possible breaks in words.

The domain name system 102 can further include a processor 212 to execute machine-readable code in the form of program instructions to perform the functionality discussed with regard to the segmentation engine 104, the linguistic analyzer 202, and the character entry analyzer 204, in additional to the methods and functionality as discussed herein. The domain name system 102 can further include a transmitter/receiver 216 to transmit and receive data from other devices within a networked, computer system environment, for example, the network 108. The domain name system 102 can further include network interface 218 to facilitate communication with other devices, for example, the client device 106, within a networked, computer system environment.

The domain name system 102 can further include a memory 214. The memory 214 can be any device capable of storing electronic information, such as RAM, flash memory, a hard disk, an internal or external database, etc. The memory 214 can be implemented as a non-transitory storage medium to store instructions adapted to be executed by the processor(s) to perform at least part of the method in accordance with certain implementations. For example, the memory can store computer program instructions, for example, computer-readable or machine-readable instructions, adapted to be executed on the processor(s), to perform the processes of the segmentation engine 202. The storage 208 can be any type of non-transitory storage medium and can store any type of data and data structures.

Figure 3:
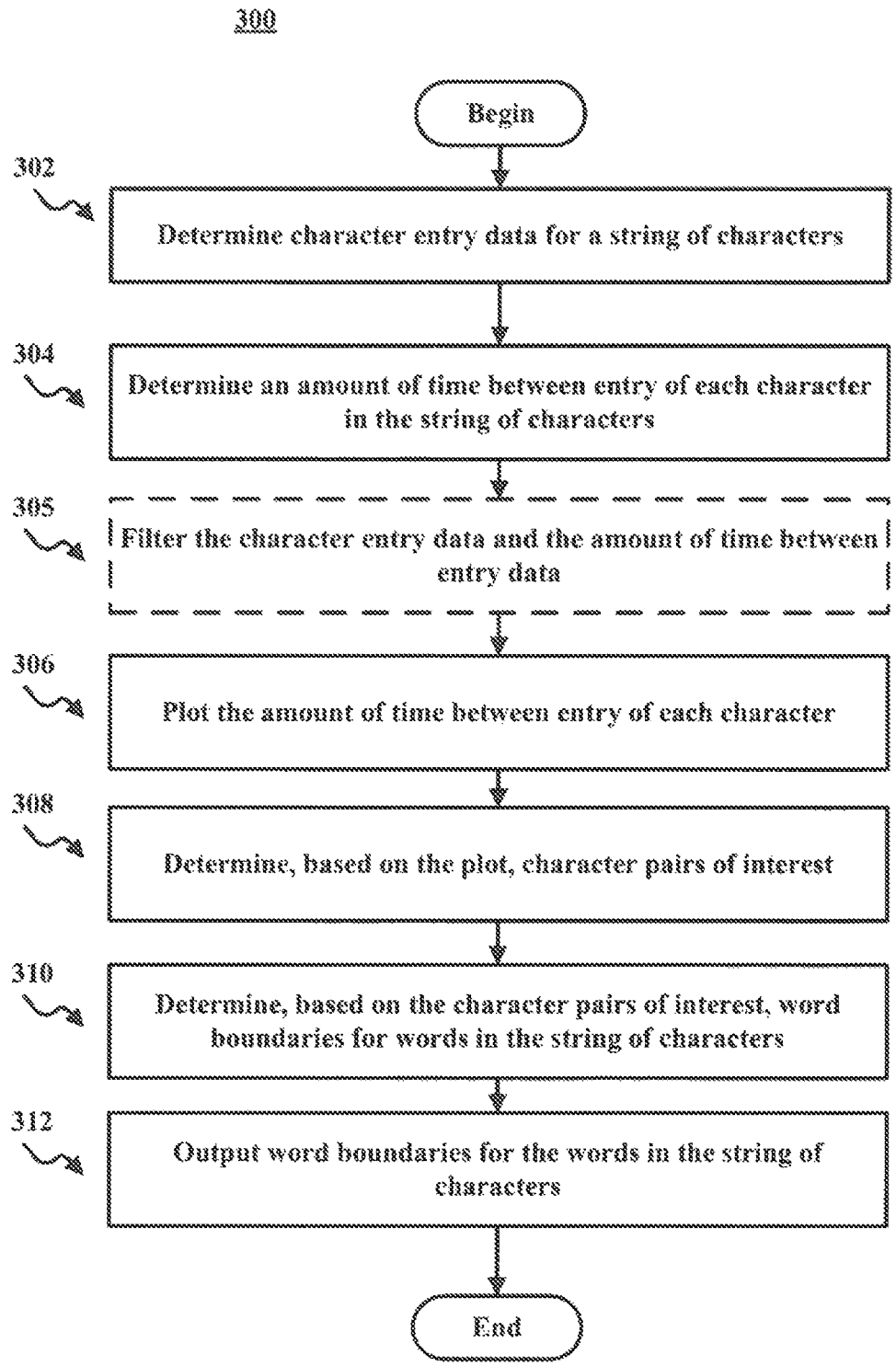
FIG. 3 shows an example of a method for analyzing a string of characters, according to implementations.

FIG. 3 illustrates an example of a method 300 for analyzing a string of characters, according to various implementations. The illustrated stages of the method are examples and that any of the illustrated stages can be removed, additional stages can be added, and the order of the illustrated stages can be changed. In some implementations, any of the illustrated stages of the method 300 can be performed by the segmentation engine 104. In some implementations, any of the illustrated stages of the method 300 can be performed by other systems, e.g., the domain name system 102, the client device 106, etc., in the environment 100 that are operating the segmentation engine 104.

After the method begins, in 302, character entry data for a string of characters can be determined. The character entry data can be the time required to enter each character in the string of characters and the time between entering each character in the string of characters on an input device. For example, the character entry data can include keystroke information such as an amount of time to key a character on a keyboard and an amount of time between keying different characters on a keyboard.

In some implementations, for example, the segmentation engine 104 can receive the character entry data from a provider of the string of characters. For example, if the client device 106 provides the string of characters, the client device 106 can record the character entry data and provide the character entry data to the segmentation engine 104. Likewise, for example, the domain name system 102 can provide the character entry data to the segmentation engine 104.

In some implementations, for example, the segmentation engine 104 can track, determine, and record the character entry data. In this example, the segmentation engine 104 (and/or the domain name system 102) can provide an interface that allows a client device 106 (or user of the client device 106) to enter a string of characters. As the string of characters are entered, the segmentation engine 104 (and/or the domain name system 102) can track and record the time required to enter each character in the string of characters and the time between entering each character in the string of characters. For instance, once a character is entered, the segmentation engine 104 (and/or the domain name system 102) can start a timer. As each character is entered, the segmentation engine 104 (and/or the domain name system 102) can record the time measured by the timer and associate the time with the character entered.

For instance, the client device 106 can enter the string of characters "choosespain." As the character "c" is entered, the segmentation engine 104 (and/or the domain name system 102) can start a timer and record a time, e.g., 0.00 milliseconds (ms) for the character "c". As each character is entered, the segmentation engine 104 (and/or the domain name system 102) can record the time from the timer and associate it with the character. For instance, as the character "h" is entered, the segmentation engine 104 (and/or the domain name system 102) can record a time of 200.00 ms; as the character "o" is entered, the segmentation engine 104 (and/or the domain name system 102) can record 410.00 ms, and the like.

In 304, an amount of time between entry of each character in the string of characters can be determined. The amount of time between entry can be determined from the character entry data for the string of characters. The amount of time can be the time between entry of character pairs in the string of characters.

For example, for "choosespain" described above, the segmentation engine 104 can determine the difference between entering each character as the time between entry of character pairs. For instance, the difference between entry of the "c" and the "h" can be 200.00 ms (200.00 ms-0.00 ms); the difference between entry of the "h" and the "o" can be 210.00 ms (410.00 ms-200.00 ms); and the like.

In some implementations, if the character entry data for the string of characters is received by the segmentation engine 104 (and/or the domain name system 102), the character entry data can include the amount of time between entry of each character. Likewise, the segmentation engine 104 (and/or the domain name system 102) can determine the amount of time between entry of each character from the character entry data received from other systems.

In 305, optionally, the character entry data and the amount of time between entry data can be filtered. In implementations, the segmentations engine 104 can perform one or more mathematical analysis to filter the character entry data and the amount of time between entry data. For example, the mathematical analysis can be performed to confirm that the character entry data and the amount of time between entry data conforms to an expected format. In some implementations, the mathematical analysis can include verifying that character entry times are consistent with normal typing patterns for a given input device. For example, a minute-long delay between two characters could indicate a distracted typist whose timing data is not appropriate for subsequent analysis and determination of word boundaries. In some implementations, the mathematical analysis can include analysis to annotate, accommodate, and/or discard certain characters that might not be useful in identifying word breaks, for example, backspace keystrokes.

In implementations, the filtering can occur after any stage described above, for example, after collecting the character entry data and determining the amount of time between entry. In implementations, the filtering can occur after any stage described below, for example, after plotting the amount of time between entry described below.

In 306, the amount of time between entry of each character can be plotted. The plot can be a graph or other data structure that represents the amount of time between entry of character pairs.

Figure 4:
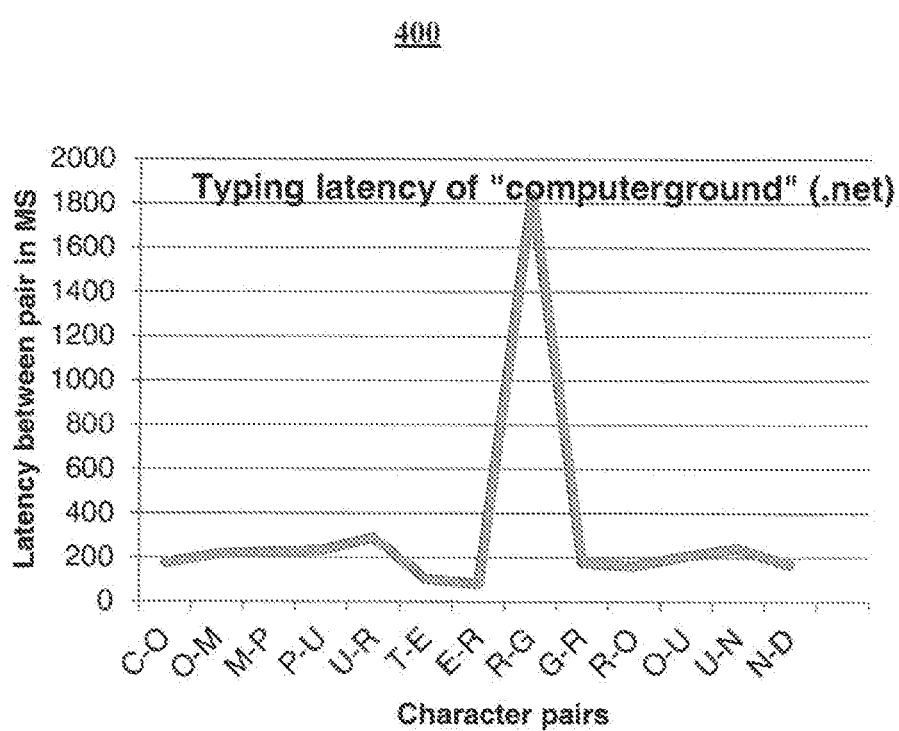
FIG. 4 shows an example of a plot of character entry data, according to implementations.

FIG. 4 illustrates one example of a plot of the amount of time between entry of characters. FIG. 4 illustrates a plot 400 for the amount of time between for an example string of characters "computerground." As illustrated, the plot 400 can be a graph with an x-axis representing the characters in the string of characters and a y-axis that representing the amount of time between entry of characters.

In 308, character pairs of interest can be determined based on the plot. The character pairs of interest can indicate possible word boundaries of words in the string of characters. The character pairs of interest can be determined based on an analysis of the plot of the amount of time between entry of each character.

In implementations, the segmentation engine 104 can perform one or more data analysis on the plot of the amount of time entry of each character. In some implementations, the data analysis can include solving for local maxima, for example, the largest amount of time between entry of a character pair when compared to neighboring character pairs. For instance, as illustrated in FIG. 4, for the string of characters "computerground," the local maxima can be determined as being between the character pair "r" and "g."

In some implementations, the data analysis can include solving for global maxima, for example, the largest amount of time between entry of a character pair when compared to all character pairs.

In some implementations, the data analysis can include determining pairs whose latency exceeds a threshold. In this implementation, for example, the threshold can be determined using average, median, or variance statistics calculated over the string of characters.

In some implementations, the data analysis can include using other types of segmentation. For example, in this implementation, the data analysis can utilize data from linguistic-based segmentation, e.g., observing user entry behavior at probabilistically confident word boundaries (per linguistic methods) towards classifying less definitive boundaries using timing data.

In implementations, any combination of the data analysis processes, described above, can be utilized to determine the character pairs of interest.

In 310, word boundaries for words in the string of text characters can be determined based on the character pairs of interest. In some implementations, for each character pair of interest, the segmentation engine 104 can determine that the character pair denotes a word boundary.

For example, for the string of characters "choosespain," the segmentation engine 104 can determine that a character pair of interest occurs between the character pair "e" and "s." In response, the segmentation engine 104 can determine that a word boundary occurs between the character pair "e" and "s," defining the words "choose" and "pain."

In 312, word boundaries for the words in the string of characters can be output. The segmentation engine 104 can output the word boundaries to other systems for use in a string of character analysis. For example, the segmentation engine 104 can output the word boundaries for use in domain name suggestion, search requests, input device operations, and the like.

The method 300 can then end, repeat, or return to any point.

Figure 5:
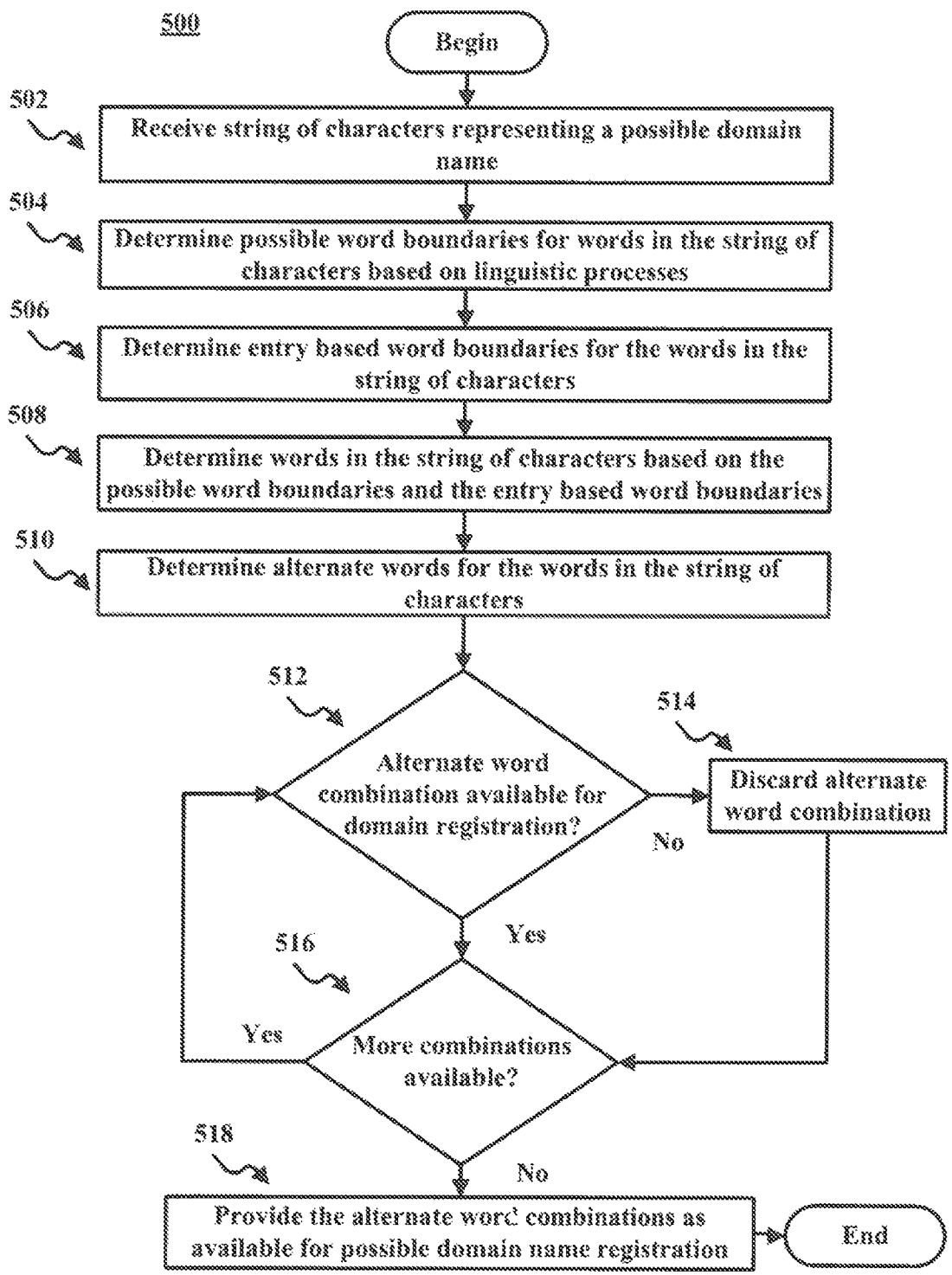
FIG. 5 shows an example method for utilizing an analysis of a string of characters, according to implementations.

FIG. 5 shows an example a method 500 for utilizing an analysis of a string of characters, according to implementations. The illustrated stages of the method are examples and that any of the illustrated stages can be removed, additional stages can be added, and the order of the illustrated stages can be changed. In some implementations, any of the illustrated stages of the method 500 can be performed by the segmentation engine 104. In some implementations, any of the illustrated stages of the method 500 can be performed by other systems, e.g., the domain name system 102, the client device 106, etc., in the environment 100 that are operating the segmentation engine 104.

After the process begins, in 502, a string of characters representing a possible domain name can be received. In some implementations, the string of characters can be received by the domain name system 102, for example, from the client device 106. In some implementations, the domain name system 102 can provide an interface for entry of the string of characters.

For example, the domain name system 102 can receive a string of characters "choosespain." In this example, a client device 106 (or user of the client device 106) may desire to register this domain name or have the domain name system 102 suggest a domain name with similar meaning or association for registration.

In 504, possible word boundaries for words in the string of characters can be determined. In embodiments, the segmentation engine 104 can analyze a string of characters to determine possible word boundaries for the string of characters. The segmentation engine 104 can analyze the string of characters utilizing one or more linguistics based algorithms, for example, dictionaries searches, "word fitness" algorithms, character co-occurrence algorithms, and other linguistic based algorithms. The segmentation engine 104 can access data sources, which can include dictionaries, "word fitness" data, character co-occurrence data, and other linguistic data in the analysis.

For example, for the string of characters "choosespain," the segmentation engine 104 can determine that the string of characters has two possible word boundaries. For instance, the two possible word boundaries can be between "s" and "b" defining the words "chooses" and "pain," and between the "s" and "b" defining the words "choose" and "spain." Because the possible words boundaries define words with distinct meanings and definitions, the possible word boundaries may be further analyzed.

In 506, entry based word boundaries for the words in the string of characters can be determined. In implementations, the segmentation engine 104 can determine the entry based word boundaries based on character entry data, for example, utilizing the method 300 described above.

In 508, words in the string of characters based on the possible word boundaries and the entry based word boundaries can be determined. In implementations, the segmentation engine 104 can compare the possible word boundaries and the entry based word boundaries, and can determine which of the word boundaries match. For those matching, the segmentation engine 104 can determine the matching word boundaries to be the actual word boundaries. The segmentation engine 104 can then segment the words based on the actual word boundaries.

For example, for the string of character "choosespain," the two possible word boundaries can be between "s" and "b" defining the words "chooses" and "pain," and between the "s" and "b" defining the words "choose" and "spain." Additionally, the segmentation engine 104 can determine that the entry based word boundary can occur between the character pair "e" and "s," defining the words "choose" and "pain." Based on comparing the possible word boundaries and the entry based word boundaries, the segmentation engine can determine that the actual word boundary occurs between the "s" and "b" defining the words "choose" and "spain."

Based on the words that were determined, various processes can be performed for the words. For example, domain name suggestion can be performed.

In 510, alternate words for the words in the string of characters can be determined. In some embodiments, for example, the domain name system 102 can maintain a thesaurus of words. The domain name system 102 can access the thesaurus and determine one or more alternate words for the determined words that have a similar meaning or definition or have a related meaning or association.

For example, for the words "choose" and "spain," the domain name system 102 can determine words such as "select," "pick," "elect," etc. for the word "choose" and can determine "espana," "barcelona," "espanola," etc. for the word "spain."

In 512, it can be determined whether alternate word combinations are available for domain registration. In implementations, the domain name system 102 can combine the alternate words and select the word combination for possible registration. The domain name system 102 can consult a central registry that maintains an authoritative database of registered domain names to determine if a domain name requested by a user is available for registration, or if it has been registered by another.

For example, for "choose" and "spain," the domain name system 102 can generate word combination such as "selectespana," "selectbarcelona," "selectespanola," "pickespana," etc.

If the alternate word combination is not available, in 514, the alternate word combination can be discarded. If an additional alternate word combination is available, the alternate word combination can be saved, and it can be determined if other alternate word combinations exist, in 516. If alternate word combinations exist, the method 500 can return to 512 and repeat.

If an additional alternate word combination does not exist, in 518, the alternate word combinations can be provided as available for possible domain name registration. In some implementations, for example, the domain name system 102 can provide a list of the alternate word combination to the requestor. In some implementations, for example, the domain name system 102 can display the alternate word combinations in an interface for viewing and selection by the requestor. If alternate word combination is selected by the requestor, the domain name system can register the alternate word combination for the requestor.

The method 500 can then end, repeat, or return to any point.

Figure 6:
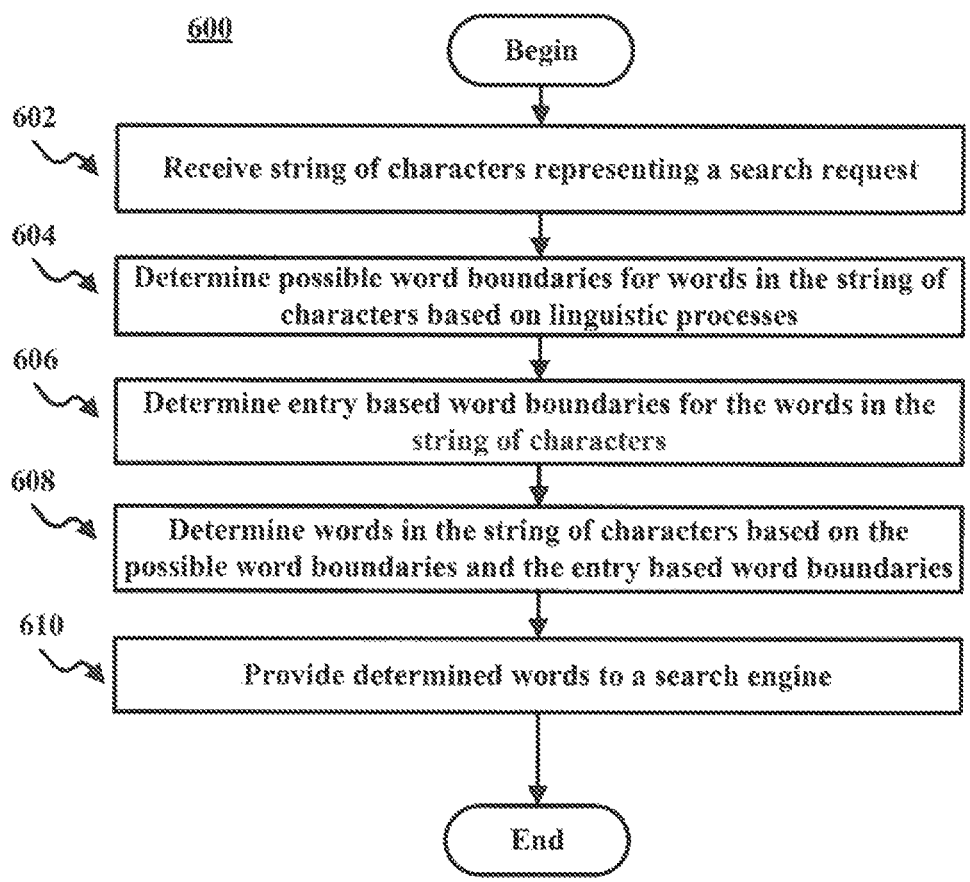
FIG. 6 shows another example method for utilizing an analysis of a string of characters, according to implementations.

FIG. 6 shows an example a method 600 for utilizing an analysis of a string of characters, according to implementations. The illustrated stages of the method are examples and that any of the illustrated stages can be removed, additional stages can be added, and the order of the illustrated stages can be changed. In some implementations, any of the illustrated stages of the method 600 can be performed by the segmentation engine 104. In some implementations, any of the illustrated stages of the method 600 can be performed by other systems, e.g., the domain name system 102, the client device 106, etc., in the environment 100 that are operating the segmentation engine 104.

After the process begins, in 602, a string of characters representing a search request can be received. In some implementations, the string of characters can be received by the domain name system 102, for example, from the client device 106. In some implementations, the domain name system 102 can provide an interface for entry of the string of characters. In some implementation, string of characters can be received from a search engine.

For example, a user may desire to perform a search related to an application or service, which may have non-space delimited input. In one example, a user may desire to search for related hashtags on the service Twittter. For instance, the segmentation engine 104 can receive, from a search engine, a string of characters "#choosespain." In another example, a user may desire to perform a search related to a domain name. For instance, the segmentation engine 104 can receive a string of characters "choosespain.com." In any example, a client device 106 (or user of the client device 106) may desire to search for information related to the string of characters.

In 604, possible word boundaries for words in the string of characters can be determined. In embodiments, the segmentation engine 104 can analyze a string of characters to determine possible word boundaries for the string of characters. The segmentation engine 104 can analyze the string of characters utilizing one or more linguistics based algorithms, for example, dictionaries searches, "word fitness" algorithms, character co-occurrence algorithms, and other linguistic based algorithms. The segmentation engine 104 can access data sources, which can include dictionaries, "word fitness" data, character co-occurrence data, and other linguistic data in the analysis.

For example, for the string of characters "choosespain," the segmentation engine 104 can determine that the string of characters has two possible word boundaries. For instance, the two possible word boundaries can be between "s" and "b" defining the words "chooses" and "pain," and between the "s" and "b" defining the words "choose" and "spain." Because the possible words boundaries define words with distinct meanings and definitions, the possible word boundaries may be further analyzed.

In 606, entry based word boundaries for the words in the string of characters can be determined. In implementations, the segmentation engine 104 can determine the entry based word boundaries based on character entry data, for example, utilizing the method 300 described above.

In 608, words in the string of characters based on the possible word boundaries and the entry based word boundaries can be determined. In implementations, the segmentation engine 104 can compare the possible word boundaries and the entry based word boundaries, and can determine which of the word boundaries match. For those matching, the segmentation engine 104 can determine the matching word boundaries to be the actual word boundaries. The segmentation engine 104 can then segment the words based on the actual word boundaries.

For example, for the string of character "choosespain," the two possible word boundaries can be between "s" and "b" defining the words "chooses" and "pain," and between the "s" and "b" defining the words "choose" and "spain." Additionally, the segmentation engine 104 can determine that the entry based word boundary can occur between the character pair "e" and "s," defining the words "choose" and "pain." Based on comparing the possible word boundaries and the entry based word boundaries, the segmentation engine can determine that the actual word boundary occurs between the "s" and "b" defining the words "choose" and "spain."

Based on the words that were determined, various processes can be performed for the words. For example, searching processes can be performed.

In 610, the determined words can be provided to a search engine. In some implementations, the segmentation engine 104 can provide the determined words to the domain name system 102, which includes a search engine. In some implementations, the segmentation engine 104 can provide the determined words to separate search engine. In some implementations, the segmentation engine 104 can be embodied in a separate search engine. The determined words can be used by the search engine to aid in the searching process.

The method 600 can then end, repeat, or return to any point.

Figure 7:
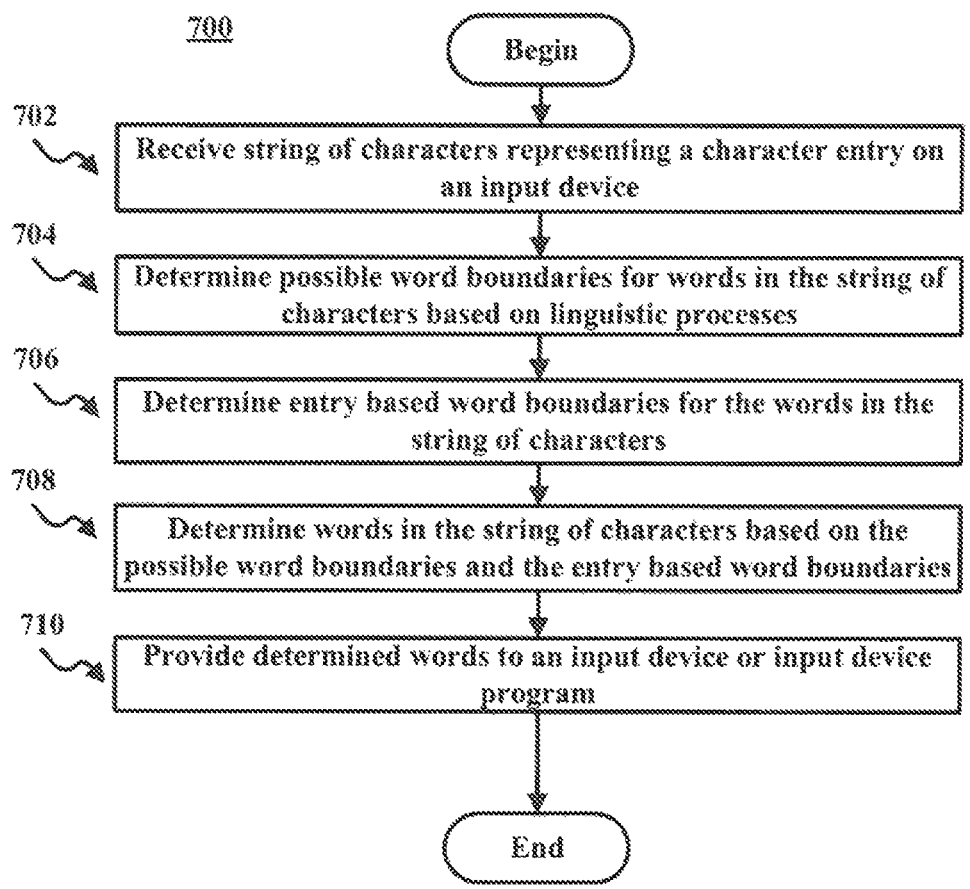
FIG. 7 shows another example method for utilizing an analysis of a string of characters, according to implementations.

FIG. 7 shows an example a method 700 for utilizing an analysis of a string of characters, according to implementations. The illustrated stages of the method are examples and that any of the illustrated stages can be removed, additional stages can be added, and the order of the illustrated stages can be changed. In some implementations, any of the illustrated stages of the method 700 can be performed by segmentation engine 104. In some implementations, any of the illustrated stages of the method 700 can be performed by other systems, e.g., the domain name system 102, the client device 106, etc., in the environment 100 that are operating the segmentation engine 104.

After the process begins, in 702, a string of characters representing a character entry on an input device can be determined. In some implementations, the string of characters can be received by the domain name system 102, for example, from the client device 106. In some implementations, the domain name system 102 can provide an interface for entry of the string of characters. In some implementations, the segmentation engine 104 can be embodied on the client device 104

For example, the segmentation engine 104 can receive a string of characters "choosespain." In this example, a client device 106 (or user of the client device 106) may be entering the string of characters into the client device 106.

In 704, possible word boundaries for words in the string of characters can be determined. In embodiments, the segmentation engine 104 can analyze a string of characters to determine possible word boundaries for the string of characters. The segmentation engine 104 can analyze the string of characters utilizing one or more linguistics based algorithms, for example, dictionaries searches, "word fitness" algorithms, character co-occurrence algorithms, and other linguistic based algorithms. The segmentation engine 104 can access data sources, which can include dictionaries, "word fitness" data, character co-occurrence data, and other linguistic data in the analysis.

For example, for the string of characters "choosespain," the segmentation engine 104 can determine that the string of characters has two possible word boundaries. For instance, the two possible word boundaries can be between "s" and "b" defining the words "chooses" and "pain," and between the "s" and "b" defining the words "choose" and "spain." Because the possible words boundaries define words with distinct meanings and definitions, the possible word boundaries may be further analyzed.

In 706, entry based word boundaries for the words in the string of characters can be determined. In implementations, the segmentation engine 104 can determine the entry based word boundaries based on character entry data, for example, utilizing the method 300 described above.

In 708, words in the string of characters based on the possible word boundaries and the entry based word boundaries can be determined. In implementations, the segmentation engine 104 can compare the possible word boundaries and the entry based word boundaries, and can determine which of the word boundaries match. For those matching, the segmentation engine 104 can determine the matching word boundaries to be the actual word boundaries. The segmentation engine 104 can then segment the words based on the actual word boundaries.

For example, for the string of character "choosespain," the two possible word boundaries can be between "s" and "b" defining the words "chooses" and "pain," and between the "s" and "b" defining the words "choose" and "spain." Additionally, the segmentation engine 104 can determine that the entry based word boundary can occur between the character pair "e" and "s," defining the words "choose" and "pain." Based on comparing the possible word boundaries and the entry based word boundaries, the segmentation engine can determine that the actual word boundary occurs between the "s" and "b" defining the words "choose" and "spain."

Based on the words that were determined, various processes can be performed for the words. For example, processes can be performed that enhance or aid the operations and function of an input device or program.

In 710, the determined words can be provided to an input device or input device program. The determined words can be utilized by the operations and function of the input device or program, such as auto correction, word suggestion, etc.

The method 700 can then end, repeat, or return to any point.

The foregoing description is illustrative, and variations in configuration and implementation can occur to persons skilled in the art. For instance, the various illustrative logics, logical blocks, modules, and circuits described in connection with the implementations disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computer devices, e.g., a combination of a DSP and a microprocessor, a plurality of microprocessors, one or more microprocessors in conjunction with a DSP core, or any other such configuration.

In one or more exemplary implementations, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 8:
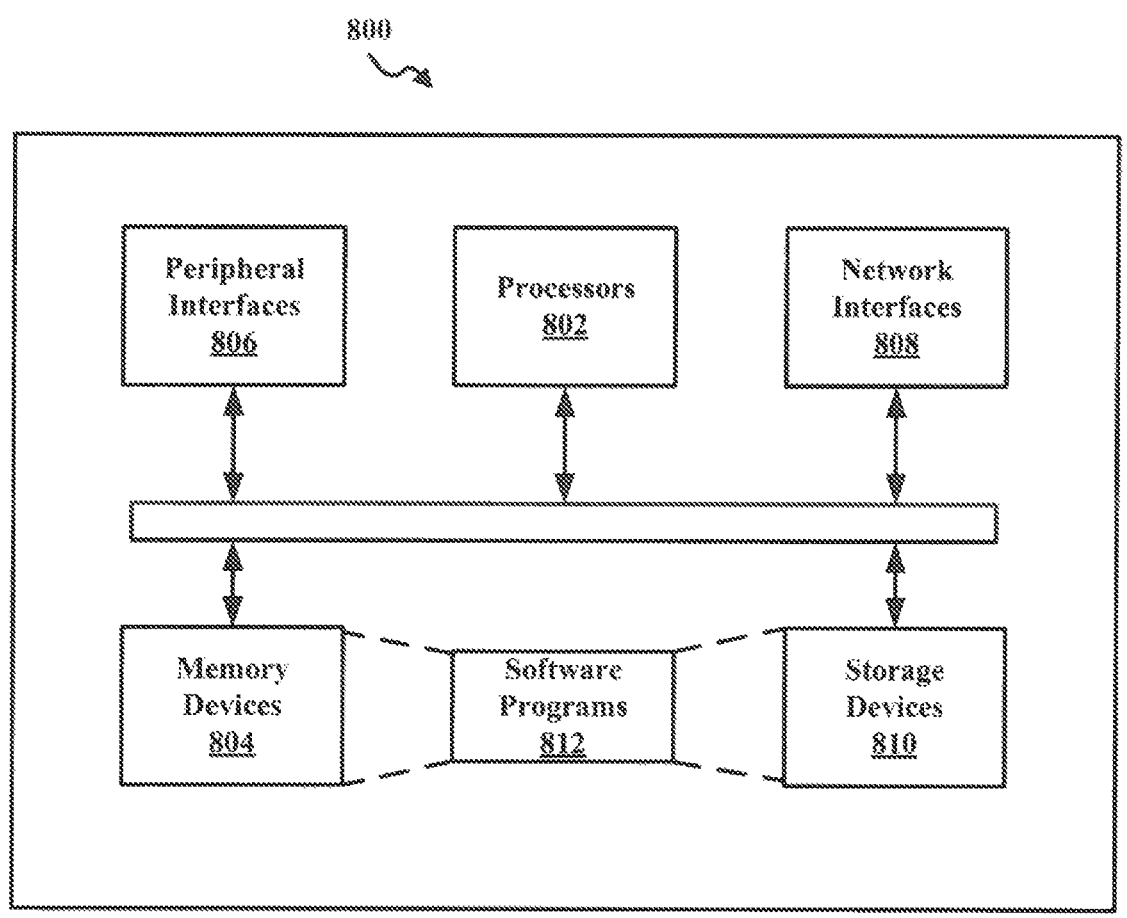
FIG. 8 shows an example computer system, according to implementations.

For example, FIG. 8 illustrates an example of a hardware configuration for a computer device 800 that can be used as any device in the environment 100, for example, the domain name system 102, the segmentation engine 104, the client devices 106, etc., which can be used to perform one or more of the processes described above. While FIG. 8 illustrates various components contained in the computer device 800, FIG. 8 illustrates one example of a computer device and additional components can be added and existing components can be removed.

The computer device 800 can be any type of computer devices, such as desktops, laptops, servers, etc., or mobile devices, such as smart telephones, tablet computers, cellular telephones, personal digital assistants, etc. As illustrated in FIG. 8, the computer device 800 can include one or more processors 802 of varying core configurations and clock frequencies. The computer device 800 can also include one or more memory devices 804 that serve as a main memory during the operation of the computer device 800. For example, during operation, a copy of the software that supports the DNS operations can be stored in the one or more memory devices 804. The computer device 800 can also include one or more peripheral interfaces 806, such as keyboards, mice, touchpads, computer screens, touchscreens, etc., for enabling human interaction with and manipulation of the computer device 800.

The computer device 800 can also include one or more network interfaces 808 for communicating via one or more networks, such as Ethernet adapters, wireless transceivers, or serial network components, for communicating over wired or wireless media using protocols. The computer device 800 can also include one or more storage devices 810 of varying physical dimensions and storage capacities, such as flash drives, hard drives, random access memory, etc., for storing data, such as images, files, and program instructions for execution by the one or more processors 802.

Additionally, the computer device 800 can include one or more software programs 812 that enable the functionality described above. The one or more software programs 812 can include instructions that cause the one or more processors 802 to perform the processes described herein. Copies of the one or more software programs 812 can be stored in the one or more non-transitory computer-readable mediums such as memory devices 804 and/or on in the one or more storage devices 810. Likewise, the data, for example, character entry data, linguistics data, DNS records, etc., utilized by one or more software programs 812 can be stored in the one or more memory devices 804 and/or on in the one or more storage devices 810.

In implementations, the computer device 800 can communicate with other devices via one or more networks. The other devices can be any types of devices as described above. The network can be any type of network, such as a local area network, a wide-area network, a virtual private network, the Internet, an intranet, an extranet, a public switched telephone network, an infrared network, a wireless network, and any combination thereof. The network 816 can support communications using any of a variety of commercially-available protocols, such as TCP/IP, UDP, OSI, FTP, UPnP, NFS, CIFS, AppleTalk, and the like. The network 816 can be, for example, a local area network, a wide-area network, a virtual private network, the Internet, an intranet, an extranet, a public switched telephone network, an infrared network, a wireless network, and any combination thereof.

The computer device 800 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 800 as described above need not be enclosed within a single enclosure or even located in close proximity to one another. Those skilled in the art will appreciate that the above-described componentry are examples only, as the computer device 800 can include any type of hardware componentry, including any necessary accompanying firmware or software, for performing the disclosed implementations. The computer device 800 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described implementations without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated implementations, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the implementations, and may also include other parts not describe in the implementations.

Accordingly, the disclosure is not limited to the above-described implementations, but instead is defined by the appended claims in light of their full scope of equivalents.

The invention claimed is:

1. A method, implemented by a computer, for determining user-specific word boundaries in a domain name, the method comprising:
  receiving a string of non-space delimited alphanumeric characters entered by a user, the string of non-space delimited alphanumeric characters comprising a plurality of words, and representing a potential domain name to be registered;
  obtaining a time value associated with a time at which each non-space delimited alphanumeric character is entered by the user;
  determining one or more possible word boundaries between the plurality of words in the string of non-space delimited alphanumeric characters based at least partially on a segmentation process;
  determining, by the computer and for each character in the string of non-space delimited alphanumeric characters, an amount of time taken between each time value associated with the time at which each non-space delimited alphanumeric character is entered by the user, wherein the amount of time is filtered;
  determining, by the computer and based on each amount of time between each time value and the one or more possible word boundaries, one or more actual time-specified word boundaries between the plurality of words in the string of non-space delimited alphanumeric characters;
  segmenting, by the computer, the string of non-space delimited alphanumeric characters into a time-specified set of words based on the one or more actual time-specified word boundaries between the plurality of words in the string of non-space delimited alphanumeric characters;
  determining, by the computer, one or more alternate words for a word from the time-specified set of words, wherein the one or more alternate words have a similar meaning to the word;
  creating, by the computer, one or more domain names using the one or more alternate words and the time-specified set of words; and
  displaying, to the user, a registration availability of the one or more domain names.

2. The method of claim 1, wherein determining one or more actual time-specified word boundaries comprises:
  determining a pair of characters that has a first amount of time between entry of the pair of characters that exceeds a second amount of time;
  comparing the pair of characters to the one or more possible word boundaries; and
  determining, based on the comparison, that the pair of characters is an actual time-specified word boundary if any of the one or more possible word boundaries match the pair of characters.

3. The method of claim 2, wherein the second amount of time is an amount of time between entry of other pairs of characters.

4. The method of claim 1, the method further comprising:
receiving a selection of at least one of the one or more domain names; and
registering the at least one of the one or more domain names.

5. The method of claim 1, wherein the segmentation process comprises one or more of a dictionary segmentation, a character co-occurrence segmentation, a linguistic segmentation, or a word fitness segmentation.

6. The method of claim 1, wherein the amount of time is filtered by excluding a delay between at least two of the non-space delimited alphanumeric characters that is above a predetermined threshold.

7. A method, implemented by a computer, for determining user-specific word boundaries in a search string, the method comprising:
receiving a string of non-space delimited alphanumeric characters entered by a user, the string of non-space delimited alphanumeric characters comprising a plurality of words, and representing a search request;
obtaining a time value associated with a time at which each non-space delimited alphanumeric character is entered by the user;
determining one or more possible word boundaries between the plurality words in the string of non-space delimited alphanumeric characters based at least partially on a segmentation process;
determining, by the computer and for each character in the string of non-space delimited alphanumeric characters, an amount of time taken between each time value associated with the time at which each non-space delimited alphanumeric character is entered by the user, wherein the amount of time is filtered;
determining, by the computer and based on each amount of time between each time value and the one or more possible word boundaries, one or more actual time-specified word boundaries between the plurality of words in the string of non-space delimited alphanumeric characters;
segmenting, by the computer, the string of non-space delimited alphanumeric characters into a time-specified set of words based on the one or more actual time-specified word boundaries between the plurality of words in the string of non-space delimited alphanumeric characters;
outputting, to a search engine, the time-specified set of words; and
receiving results of a search for the time-specified set of words from the search engine.

8. The method of claim 7, wherein determining one or more actual time-specified word boundaries comprises:
determining a pair of characters that has a first amount of time between entry of the pair of characters that exceeds a second amount of time;
comparing the pair of characters to the one or more possible word boundaries; and
determining, based on the comparison, that the pair of characters is an actual time-specified word boundary if any of the one or more possible word boundaries matches the pair of characters.

9. The method of claim 8, wherein the second amount of time is an amount of time between entry of other pairs of characters.

10. The method of claim 7, wherein the segmentation process comprises one or more of a dictionary segmentation, a character co-occurrence segmentation, a linguistic segmentation, or a word fitness segmentation.

11. A method, implemented by a computer, for autocorrecting a string of non-space delimited alphanumeric characters based on character entry timing by a user, the method comprising:
receiving the string of non-space delimited alphanumeric characters entered by the user, the string of non-space delimited alphanumeric characters comprising a plurality of words, and representing entry of the string of non-space delimited alphanumeric characters on an input device;
obtaining a time value associated with a time at which each non-space delimited alphanumeric character is entered by the user;
determining one or more possible word boundaries between the plurality of words in the string of non-space delimited alphanumeric characters based at least partially on a segmentation process;
determining, by the computer and for each character in the string of non-space delimited alphanumeric characters, an amount of time taken between each time value associated with the time at which each non-space delimited alphanumeric character is entered by the user, wherein the amount of time is filtered;
determining, by the computer and based on each amount of time between each time value and the one or more possible word boundaries, one or more actual time-specified word boundaries between the plurality of words in the string of non-space delimited alphanumeric characters;
segmenting, by the computer, the string of non-space delimited alphanumeric characters into a time-specified set of words based on the one or more actual time-specified word boundaries between the plurality of words in the string of non-space delimited alphanumeric characters; and
outputting, to the input device, the time-specified set of words, whereby the input device automatically completes or automatically corrects a display of the string of non-space delimited alphanumeric characters entered by the user based on the time-specified set of words.

12. The method of claim 11, wherein determining one or more actual time-specified word boundaries comprises:
determining a pair of characters that has a first amount of time between entry of the pair of characters that exceeds a second amount of time;
comparing the pair of characters to the one or more possible word boundaries; and
determining, based on the comparison, that the pair of characters is an actual time-specified word boundary if any of the one or more possible word boundaries matches the pair of characters.

13. The method of claim 12, wherein the second amount of time is an amount of time between entry of other pairs of characters.

14. The method of claim 11, wherein the segmentation process comprises one or more of a dictionary segmentation, a character co-occurrence segmentation, a linguistic segmentation, or a word fitness segmentation.

15. A non-transitory computer-readable medium comprising instructions which, when executed by at least one processor, cause the at least one processor to perform a method comprising:
receiving a string of non-space delimited alphanumeric characters entered by a user, the string of non-space delimited alphanumeric characters comprising a plurality of words, and representing a potential domain name to be registered;

obtaining a time value associated with a time at which each non-space delimited alphanumeric character is entered by the user;

determining one or more possible word boundaries between the plurality of words in the string of non-space delimited alphanumeric characters based at least partially on a segmentation process;

determining, by the processor and for each character in the string of non-space delimited alphanumeric characters, an amount of time taken between each time value associated with the time at which each non-space delimited alphanumeric character is entered by the user, wherein the amount of time is filtered;

determining, by the processor and based on each amount of time between each time value and the one or more possible word boundaries, one or more actual time-specified word boundaries between the plurality of words in the string of non-space delimited alphanumeric characters;

segmenting, by the processor, the string of non-space delimited alphanumeric characters into a time-specified set of words based on the one or more actual time-specified word boundaries between the plurality of words in the string of non-space delimited alphanumeric characters;

determining, by the processor, one or more alternate words for a word from the time-specified set of words, wherein the one or more alternate words have a similar meaning to the word;

creating, by the processor, one or more domain names using the one or more alternate words and the time-specified set of words; and displaying, to the user, a registration availability of the one or more domain names.

16. The non-transitory computer-readable medium of claim 15, wherein determining one or more actual time-specified word boundaries comprises:

determining a pair of characters that has a first amount of time between entry of the pair of characters that exceeds a second amount;

comparing the pair of characters to the one or more possible word boundaries; and determining, based on the comparison, that the pair of characters is an actual time-specified word boundary if any of the one or more possible word boundaries match the pair of characters.

17. The non-transitory computer-readable medium of claim 16, wherein the second amount of time is an amount of time between entry of other pairs of characters.

18. The non-transitory computer-readable medium of claim 15, the method further comprising:

receiving a selection of at least one of the one or more domain names; and registering the at least one of the one or more domain names.

19. The non-transitory computer-readable medium of claim 15, wherein the segmentation process comprises one or more of a dictionary segmentation, a character co-occurrence segmentation, a linguistic segmentation, or a word fitness segmentation.

* * * * *

UNITED STATES PATENT AND TRADEMARK OFFICE
CERTIFICATE OF CORRECTION

PATENT NO. : 10,771,427 B2  
APPLICATION NO. : 15/046814  
DATED : September 8, 2020  
INVENTOR(S) : Andrew West Page 1 of 1

It is certified that error appears in the above-identified patent and that said Letters Patent is hereby corrected as shown below:

On the Title Page

Item (73) Assignee: "VERSIGN, INC." should read --VERISIGN, INC.--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*